United States Patent
Jones et al.

(10) Patent No.: US 10,979,103 B2
(45) Date of Patent: Apr. 13, 2021

(54) WIRELESS BACKHAUL USING RELAY NODES IN A CELLULAR NETWORK

(71) Applicant: T-Mobile USA, Inc., Bellevue, WA (US)

(72) Inventors: David Jones, Bellevue, WA (US); Ahmad Armand, Sammamish, WA (US); Cameron Byrne, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/457,777

(22) Filed: Jun. 28, 2019

(65) Prior Publication Data

US 2020/0412414 A1    Dec. 31, 2020

(51) Int. Cl.
*H04B 7/026* (2017.01)
*H04W 76/15* (2018.01)
*H04W 88/04* (2009.01)
*H04W 84/18* (2009.01)

(52) U.S. Cl.
CPC ............ *H04B 7/026* (2013.01); *H04W 76/15* (2018.02); *H04W 88/04* (2013.01); *H04W 84/18* (2013.01)

(58) Field of Classification Search
CPC ................ H04B 7/026; H04B 7/15521; H04B 7/15528; H04W 76/15; H04W 88/04; H04W 84/18; H04W 28/0252; H04W 40/04; H04W 40/12; H04W 40/22; H04W 72/04; H04W 72/042; H04W 72/0486; H04W 88/14; H04L 2212/00; H04L 45/123; H04L 47/125; H04L 5/0082
See application file for complete search history.

(56) References Cited

U.S. PATENT DOCUMENTS

| | | |
|---|---|---|
| 9,232,516 B1 | 1/2016 | Oroskar et al. |
| 2011/0051921 A1 | 3/2011 | Flannery et al. |
| 2013/0201902 A1 | 8/2013 | Nagata et al. |

(Continued)

FOREIGN PATENT DOCUMENTS

WO    WO2011051921 A2    5/2011

OTHER PUBLICATIONS

Extended European Search Report dated Oct. 27, 2020 for European Patent Application No. 20177597.0, a counterpart foreign application of U.S. Appl. No. 16/457,777, 13 pages.

(Continued)

*Primary Examiner* — Freshteh N Aghdam
(74) *Attorney, Agent, or Firm* — Lee & Hayes, P.C.

(57) ABSTRACT

Techniques are discussed herein for providing wireless backhaul using relay nodes in a cellular network. Using techniques described herein, the higher frequency bands available in 5G networks are utilized to provide both wireless backhaul links and access links. A mesh of wireless nodes, such as Integrated Access and Backhaul (IAB) nodes can be utilized to provide wireless backhaul links and access links in a 5G network. One or more relay nodes may be wirelessly coupled to a base station node, such as gNodeB, that includes a wired connection to the core network. The wireless backhaul extends coverage to user equipment (UE) that are not directly connected to a gNodeB base station. The allocation and scheduling of bandwidth may be determined by the relay nodes (i.e., IABs) and/or the wired nodes (i.e., gNodeBs).

20 Claims, 6 Drawing Sheets

(56) References Cited

U.S. PATENT DOCUMENTS

| | | | |
|---|---|---|---|
| 2018/0092139 A1 | 3/2018 | Novlan et al. | |
| 2020/0029384 A1* | 1/2020 | Hong | H04W 40/34 |
| 2020/0044732 A1* | 2/2020 | Cui | H04B 7/2606 |
| 2020/0137611 A1* | 4/2020 | Majmundar | H04W 40/246 |
| 2020/0137659 A1* | 4/2020 | Zhu | H04W 40/246 |
| 2020/0145860 A1* | 5/2020 | Koskela | H04W 16/28 |
| 2020/0177271 A1* | 6/2020 | Ghosh | H04W 80/08 |
| 2020/0275499 A1* | 8/2020 | Novlan | H04W 76/12 |

OTHER PUBLICATIONS

3GPP; "Technical Specification Group Radio Access Network; Study on Integrated Access and Backhaul; (Release 15)", vol. RAN WG2, No. V0.5.0, Sep. 26, 2018, pp. 1-78.

Intel Corporation, Overview on RAN1 1-14 related issues in IAB, 3GPP Draft, vol. RAN WGI, No. Sanya, China; Apr. 15, 2018, Retrieved from <<http://www.3gpp.org/ftp/Meetings%5F3GPP%5FSYNC/RAN1/Docs/>>, 15 pgs.

\* cited by examiner

WIRELESS BACKHAUL USING RELAY NODES IN A CELLULAR NETWORK

BACKGROUND

Different techniques can be used to connect remote cellular communications sites ("cell towers") with a core, or "backbone," cellular network to provide voice and data connectivity, among other things. Cellular service providers can use wired backhauls to provide backhaul for broadband cellular services and to support the addition of new cell sites to provide additional bandwidth and/or additional wireless coverage.

Service providers can use fiber optic cable, for example, to connect many cell sites to the core network for cellular backhaul. Wired backhauls that utilize fiber and/or copper cabling, however, are expensive and time-consuming to deploy. In many cases, such as for some rural applications, certain small cell deployments, and/or temporarily extending network capacity, it is not cost effective to deploy a wired backhaul.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are techniques and systems for providing wireless backhaul using relay nodes in a cellular network, such as a 5G network. The need for cellular backhaul has increased dramatically as the number of mobile devices and the use of cellular data services has increased. In many cases, cell towers may include a wired connection to provide backhaul links. For example, a cell tower may be connected to the core network using fiber optic, coaxial, or other wired connections. Deploying fiber, copper or microwave point-to-point for backhaul, however, can be expensive and time consuming.

Using techniques described herein, the higher frequency bands available in cellular networks, such as 5G networks, are utilized to provide both wireless backhaul links and access links. According to some configurations, a mesh of wireless nodes, such as Integrated Access and Backhaul (IAB) nodes (which may be referred to herein as "relay nodes"), are utilized to provide wireless backhaul links and access links in a 5G network. One or more relay nodes may be wirelessly coupled to a base station node (which may also be referred to herein as a "wired node"), such as gNodeB, that includes a wired connection to the core network. The wireless backhaul extends coverage to user equipment (UE) that are not directly connected to a gNodeB base station. The relay nodes are configured to provide wireless access to any UE that is connected. For example, a relay node may provide wireless access to each of the UEs connected to it, along with providing wireless backhaul received from one or more other relay nodes.

The relay nodes providing the wireless backhaul and access can be configured as a mesh network. In some examples, the relay nodes can be deployed in a chain configuration to provide extended coverage along a straight (or relatively straight) corridor, such as along a rural highway. In other examples, the relay nodes may be arranged to provide additional coverage within an area, such as within a city. In some cases, the relay nodes may be temporarily placed for an event, or some other occurrence.

According to some configurations, the allocation and scheduling of bandwidth may be determined by the relay nodes (i.e., IABs) and/or the wired nodes (i.e., gNodeBs). For instance, a wired node can determine how to allocate and schedule bandwidth to the connected relay nodes, whereas the relay nodes may determine how to allocate bandwidth to user equipment (UE) that is connected to the relay node. Providing both a wireless backhaul and access to UEs utilizing relay nodes, can enable operators to deploy cell sites with high capacity but without the added cost of deploying fiber, copper or conventional microwave point-to-point for backhaul. Example implementations are provided below with reference to the following figures.

Figure 1:
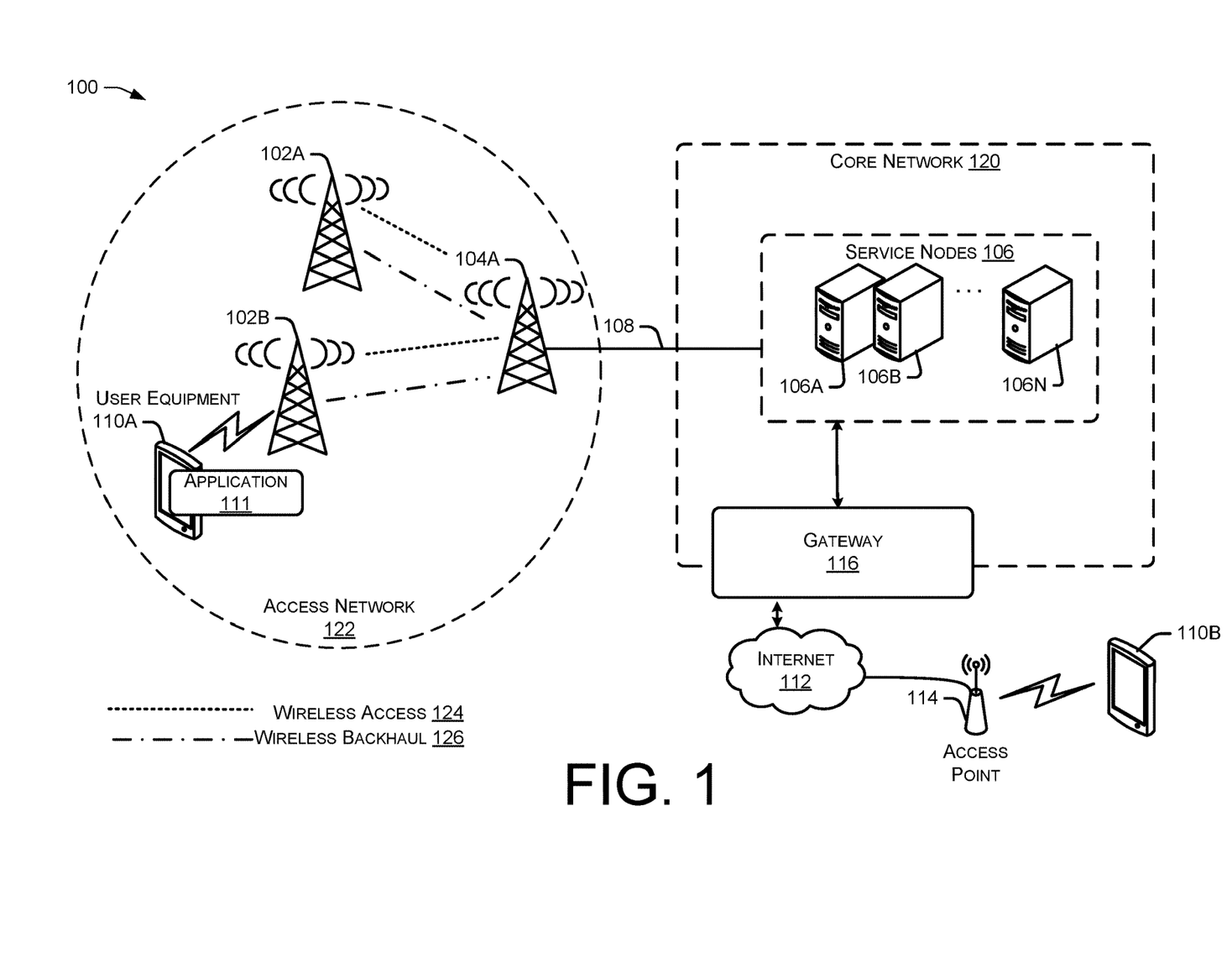
FIG. 1 is a block diagram showing an illustrative environment for providing wireless backhaul in a cellular network.

FIG. 1 is a block diagram showing an illustrative environment 100 for providing wireless backhaul in a cellular network. The environment 100 may include a core network 120 and an access network 122 that is associated with a wireless service provider. The environment 100 is illustrated in simplified form and may include many more components.

The environment 100 may include nodes, such as relay nodes 102A, 102B and one or more wired nodes, such as wired node 104A. The environment 100 may also include one or more access points 114, one or more gateways 116, and one or more service nodes 106. A relay node 102 and/or a wired node 104 may handle traffic and signals between electronic devices, such as the user equipment 110A and 110B, and a core network 120. For example, a node 102, 104 may perform the transcoding of speech channels, allocation of radio channels to electronic devices, paging, transmission and reception of voice and data, as well as other functions. A node 102, 104 may include several base transceiver stations (BTS), each BTS may include a transceiver, antenna, and additional network switch and control equipment that provide a network cell for facilitating wireless communication between UE computing devices and the core network 120. In some examples, the nodes 102, 104 include a gNodeB and/or an eNodeB.

The core network 120 may be responsible for routing voice communication to other networks, as well as routing data communication to external packet switched networks, such as the Internet 112. For example, the one or more service nodes 106 may be a Gateway GPRS Support Node (GGSN) or another equivalent node. According to some configurations, the one or more service nodes also include a Policy and Charging Rules Function (PCRF) node that utilized to enforce policy rules of the network. The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. Additionally, some data can be prioritized within the network.

The user equipment 110A and 110B are computing devices that may be a smart phone, a personal digital assistant, a netbook, a laptop computer, and/or another electronic that is capable of sending and/or receiving voice or data using a cellular access network 122, and/or over a Wi-Fi network, or some other type of network. In some instances, the computing devices 110A and 110B can be configured to send and receive data using any wired or wireless protocols.

In some configurations, one or more of the service nodes 106 may be configured as one or more application servers that provide support for one more applications, such as application 111. Some example applications include, but are not limited to browser applications, messaging applications, voice applications (e.g., Voice over Internet Protocol "VoIP" applications), video applications, and the like. While the service nodes 106 are illustrated within the core network 120, one or more other computing devices may be located outside of the core network 120. For example, an application server, or some other server or device, may be connected to the core network 120 via one or more external packet switched networks, such as the Internet.

According to some configurations, a telephony client application, such as application 111, on the UE 110A may establish data communication with the network 120 through a data connection to the relay node 102B. The relay node 102B may be a node that routes a communication wirelessly from the UE 110A through the access network 122 to the wired node 104A for communication to the core network 120.

When a communication request arrives at the network 120, one or more of the service nodes 106 may determine the identity of the originating computing device for the communication (e.g., using a telephone number, IMEI, IMSI, IP address) as well as the identity of the computing devices to send the communication. According to some configurations, a UE 110B may connect to the service nodes 106, or some other component such as an application server, via the Internet 112. In such instances, the UE 110B may connect to the Internet 112 via Wi-Fi access point 114. Accordingly, data traffic from the UE 110B may be routed to the service nodes 106 by the gateway 116 of the network 120.

In some configurations, a wireless service provider may utilize alternative access vendor (AAV) networks, for example, which utilize Ethernet networks to provide a wired connection, such as wired connection 108, to provide at least a portion of backhaul for broadband cellular services, such as 5G networks. In other examples, the wireless service provider may deploy its own wired connections.

In general, a node, such as relay nodes 102 and wired nodes 104 can be implemented as a variety of technologies to provide wired and/or wireless access to the network, as discussed herein. In some instances, the nodes 102, 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 102, 104 can include any number and type of transceivers and/or base stations representing any number and type of macrocells, microcells, picocells, or femtocells, for example, with any type or amount of overlapping coverage or mutually exclusive coverage. The nodes 102, 104 can be associated with access network 122.

In some instances, the environment 100 can further include one or more servers, including service nodes 106, to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 110, the nodes 102, 104, and one or more endpoints of the network (e.g., service nodes 106, websites, etc.). While FIG. 1 illustrates an example environment 100, it is understood in the context of this document, that the techniques discussed herein may also be implemented in other networking technologies.

The access network 122 can be any sort of access network, such as a GSM or UMTS network. The access network 108 can include any aspects of one or more of second, third, fourth generation, and fifth generation (2G, 3G, 4G, and 5G) cellular-wireless access technologies. The access network 122 can also be referred to as a universal terrestrial radio network (UTRAN) or a GSM EDGE radio access network (GERAN) and can include one or base stations, as well as a radio network controller (RNC).

Examples of the user equipment (UE) 110 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 110 include, but are not limited to, smart devices such as televisions, music players, or any other electronic appliances that can generate, request, receive, transmit, or exchange voice, video, and/or digital data over a network.

The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

As shown in FIG. 1, some base stations, such as relay nodes 102A and 102B, have no physical (i.e., "wired") data connection to network. In other words, relay nodes 102 are not connected to the core network 120 using fiber cabling, copper cabling, and/or some other type of wired connection. As illustrated, the relay nodes 102A and 102B are connected to one or more wired nodes 104, such as node 104, that does have a wired connection to the core network 120. A wired node utilizes fiber, or other wired data connections, to connect to the core network 120. As shown, wired node 104A connects to the core network via an Ethernet connection 108 via a fiber optic, coaxial, or other high speed wired data connection. A wired node 104 could also be connected by a coaxial, T1, T3, or other suitable high-speed connection to the core network 120.

Regardless of the connection type, however, changing a relay node 102 to a wired node may involve installing a new cable, fiber, satellite dish, microwave transceiver, or other equipment, and can involve considerable cost and time. The cost of installation of a wired backhaul connection can vary widely based on the distance from the relay node 102 to the network 120, for example, where longer distances may require the installation of longer cables or more powerful transceivers, for example. Installation costs may also vary due to the terrain at the relay node 102. Installation in mountainous locations, for example, may be much more expensive than an installation on flat ground or in a city.

In some configurations, mesh networking technology can be used to connect different nodes within the access network 122. Geographic Information Services (GIS) and other terrain and location information systems can be used to determine nodes to provide a connection between one or more non-connected sites 102 and a network 120. As discussed in more detail below, different techniques can be utilized to determine backhaul paths and access paths between the nodes 102 and 104.

As illustrated in FIG. 1, the higher frequency bands available in 5G networks are utilized to provide both wireless backhaul links 126 and access links 124 between relay nodes 102 and wired nodes 104. According to some configurations, the nodes 102, and 104 form a mesh of wireless nodes that include Integrated Access and Backhaul (IAB) nodes ("relay nodes"), and gNodeB nodes 104 ("wired nodes") that includes a wired connection 108 to the core network 120. The relay nodes 102 extend coverage to user equipment (UE) 110 that are not directly connected to a wired node 104. Sharing the wireless channel of a relay node 102 to provide wireless access to connected UEs, and a wireless backhaul can enable cellular service provider to deploy cell sites with high capacity but without the added cost of deploying fiber, copper or conventional microwave point-to-point for backhaul According to some configurations, the allocation and scheduling of bandwidth between the different nodes 102, 104 may be determined using one or more of the relay nodes 102 and/or the wired nodes 104. For instance, a wired node 104 can be configured to determine how to allocate and schedule bandwidth to the connected relay nodes 102, whereas the relay nodes 102 may determine how to allocate bandwidth to user equipment (UE) that is connected to the relay node. In other examples, the wired node may determine the allocation and scheduling for each of the relay nodes 102. In yet other examples, the distribution of allocating and/or scheduling the available bandwidth can be split differently among the nodes. The allocation of bandwidth and/or routing the data through the nodes 102, 104 can be determined using different techniques.

Some techniques include but are not limited to a Minimum Spanning Tree (MST) technique, an Adaptive Graph Minimum Spanning Tree Algorithm (AG-MST) technique, and the like. Generally, MST or AG-MST can be utilized by one or more of the nodes 102, 104 to select the nodes to utilize for wireless access links 124 and wireless backhaul links 126 between the UE 110A and the wire node 104A.

The nodes of the graph utilized in MST and/or AG-MST can be represented by the different nodes 102, 104 within environment 100. Some of the paths between the nodes 102, 104 be considered more expensive, because they are longer, do not have as much available bandwidth, and the like. These paths may be represented by edges with larger weights.

A spanning tree for the graph which includes the vertices of the graph, with the minimum possible number of edges. In general, a graph may have several spanning trees. A minimum spanning tree is the route between the nodes with the lowest total cost. This information can be used to identify and select the different relay nodes 102 that can act as relays to the wired connection 104.

In some configurations, the wired node 104 identifies the relay nodes 102 that are coupled to the wired node and the UEs 110 that are coupled to the relay nodes. According to some examples, a relay node 102 may determine and provide the number of UEs 110 that are connected to it to the wired node 104. For instance, relay node 102B may transmit to wired node 104A that one UE 110A is connected. This data may be utilized to assist in determining how much available bandwidth is available to provide wireless backhaul links 126 and access links by a particular relay node. More details are provided below with regard to FIGS. 2-6.

Figure 2:
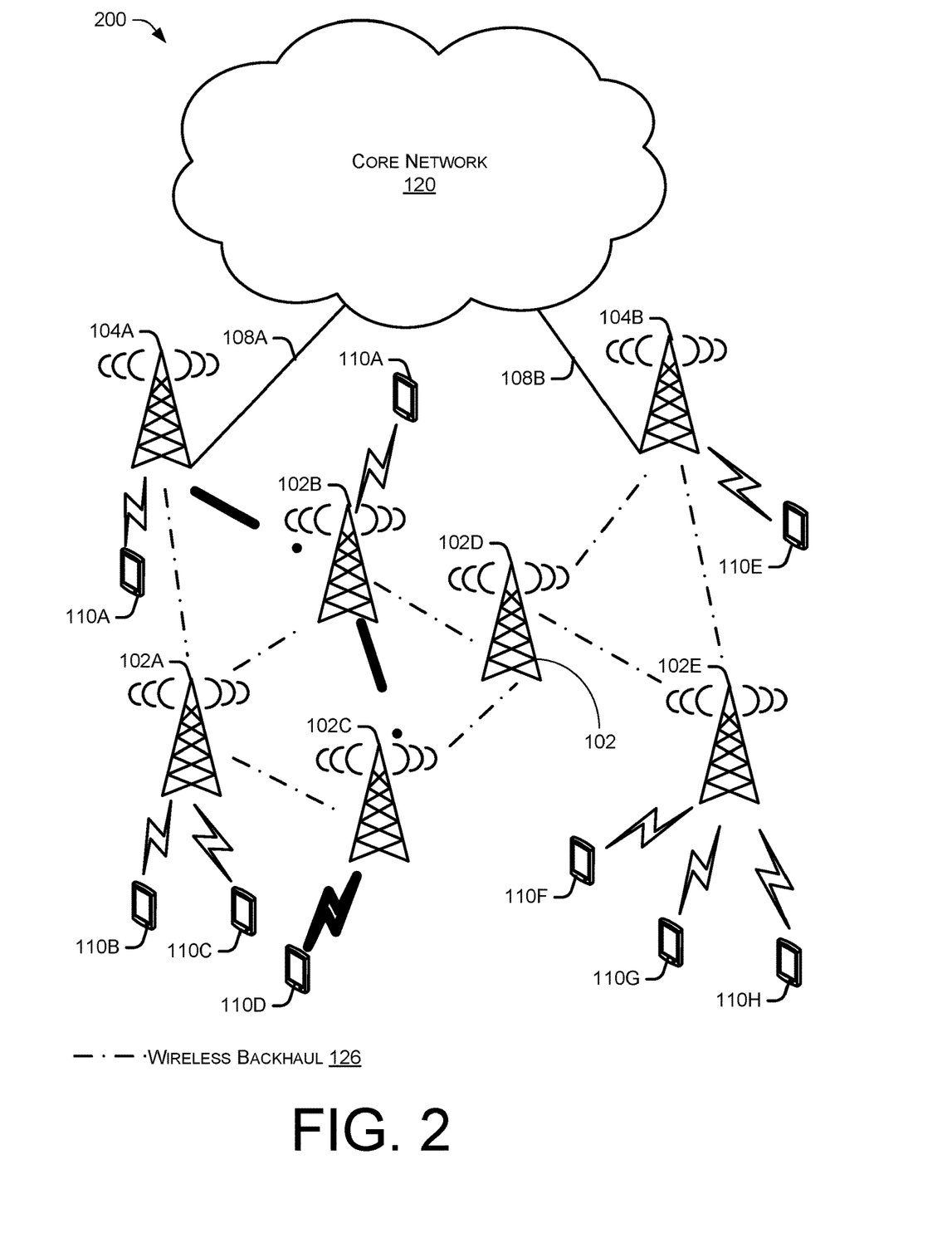
FIG. 2 is a diagram showing an illustrative arrangement of relay nodes providing wireless backhaul in a cellular network.

FIG. 2 is a diagram showing an illustrative environment of relay nodes providing wireless backhaul in a cellular network. As illustrated, environment 200 includes wired nodes 104A, and 104B, relay nodes 102A-102E, and UEs 110A-110H. As discussed above, the scheduling an allocation of bandwidth between a UE 110 and a wired node 104 can be determined by a single node, such as one or more wired nodes 104, one more relay nodes 102, and/or some other component or device or by some combination of nodes. In some configurations, a wired node 104 that is coupled to a UE may be used to perform the scheduling an allocation of bandwidth.

As an example, wired node 104A may be configured to determine the scheduling an allocation of bandwidth between UE 110A and wired node 104A. In the current example, wired node 104A may determine the relay nodes 102 to utilize for providing the wireless backhaul links 126 and the access links 124. As discussed above, the wired node 104A may use one or more techniques (e.g., MST) to select the relay nodes 102 to utilize.

The different techniques to determine the path through the mesh can be selected based on available bandwidth of a link, forecasted usage of the link, and the like. In the current example, the wired node 104A selected relay nodes 102B and 102C to provide wireless backhaul 126 for UE 110D. The selection of the relay nodes utilized may change over time depending on network conditions, and other factors. For example, if more UEs 110 connected to relay node 102B, and/or 102C, a different path using one or more different relay nodes 102 may be selected. In some configurations, in addition to determining a path through the mesh, one or more nodes, such as the wired node 104A, determines how to allocate the available bandwidth between the wireless backhaul links 126 and the wireless access links 124. For instance, the determination can be based on past usage of the wireless channel, current usage of the wireless channel, and/or future usage of the wireless channel.

Figure 3:
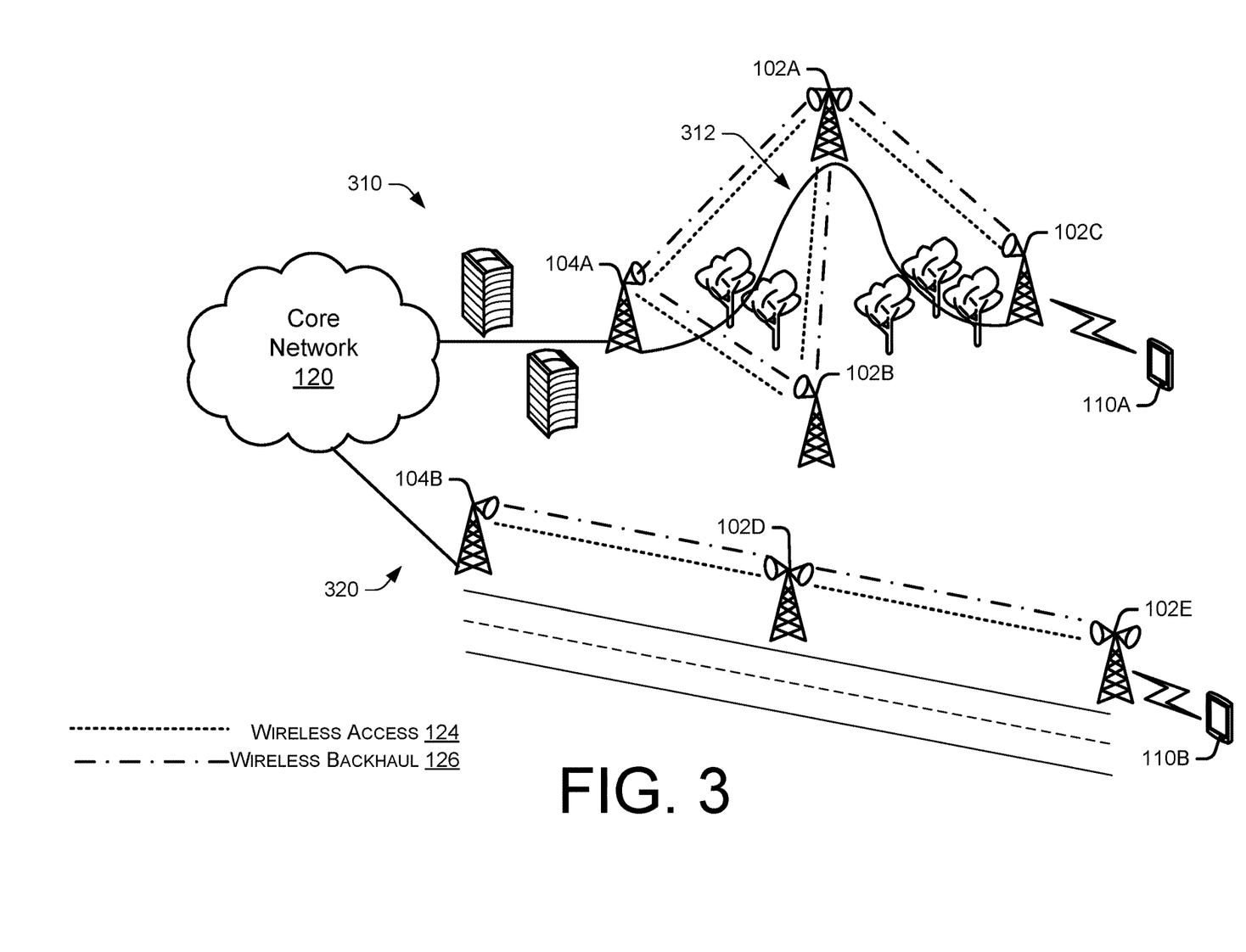
FIG. 3 is a diagram showing illustrative arrangements of relay nodes for providing wireless backhaul in a cellular network.

FIG. 3 is a diagram showing illustrative arrangements of relay nodes for providing wireless backhaul in a cellular network. As illustrated, FIG. 3 shows a first configuration 310 of relay nodes 102A, 102B, 102C coupled to a wired node 104A, and a second configuration 320 of relay nodes 102D, and 102E coupled to wired node 104B.

The signals of the microwave and millimeter bands associated with 5G networks travel along sight lines, but also spread as they propagate. As a result, both the linear, or visual, line-of-sight (LoS), and the area covered by the signal are of significance. The area that the signal covers as it spreads out is referred to as the Fresnel zone, which is generally required to be clear and free of obstructions to be considered true LoS.

When positioning relay nodes 102, pathways between the nodes 102, 104 may be selected to minimize obstructions. The obstructions can be, for example, trees, mountains, buildings, or other large objects that substantially block the propagation of a signal. A relay node 102 may be positioned such that LoS locations have both an unobstructed linear pathway between nodes and an unobstructed Fresnel zone. In other examples, it may not be possible to position relay nodes 102 to avoid at least some of the obstructions. For example, some relay nodes 102 may have an unobstructed linear pathway, but a Fresnel zone that is at least partially obstructed.

One or more relay nodes 102 can be located on third-party infrastructure, such as, for example, third-party buildings, towers, and trees. The relay nodes may be positioned to improve the LoS. In some examples, more than one relay node 102, can be installed at a same location.

As shown in FIG. 3, configuration 310 illustrates a mesh of relay nodes 102A, 102B and 102C at different locations relative to a hill 312 and wired node 104A. In this example, UE 110A may be coupled to wired node 104A using a combination of relay node 102C, 102A and/or 102B. In other words, more than one path through the relay nodes 102 may be utilized to provide access links 124 and/or wireless backhaul links 126.

Configuration 320 illustrates relay nodes 102D, and 102E connected to wired node 104B and UE 110B. In configuration 320, a single path using relay nodes 102D and 102E coupled UE 110B to the wired node 104B. As discussed herein, the relay nodes 102 providing the wireless backhaul links 126 and the access links 124 can be configured in a variety of configurations.

Figure 4:
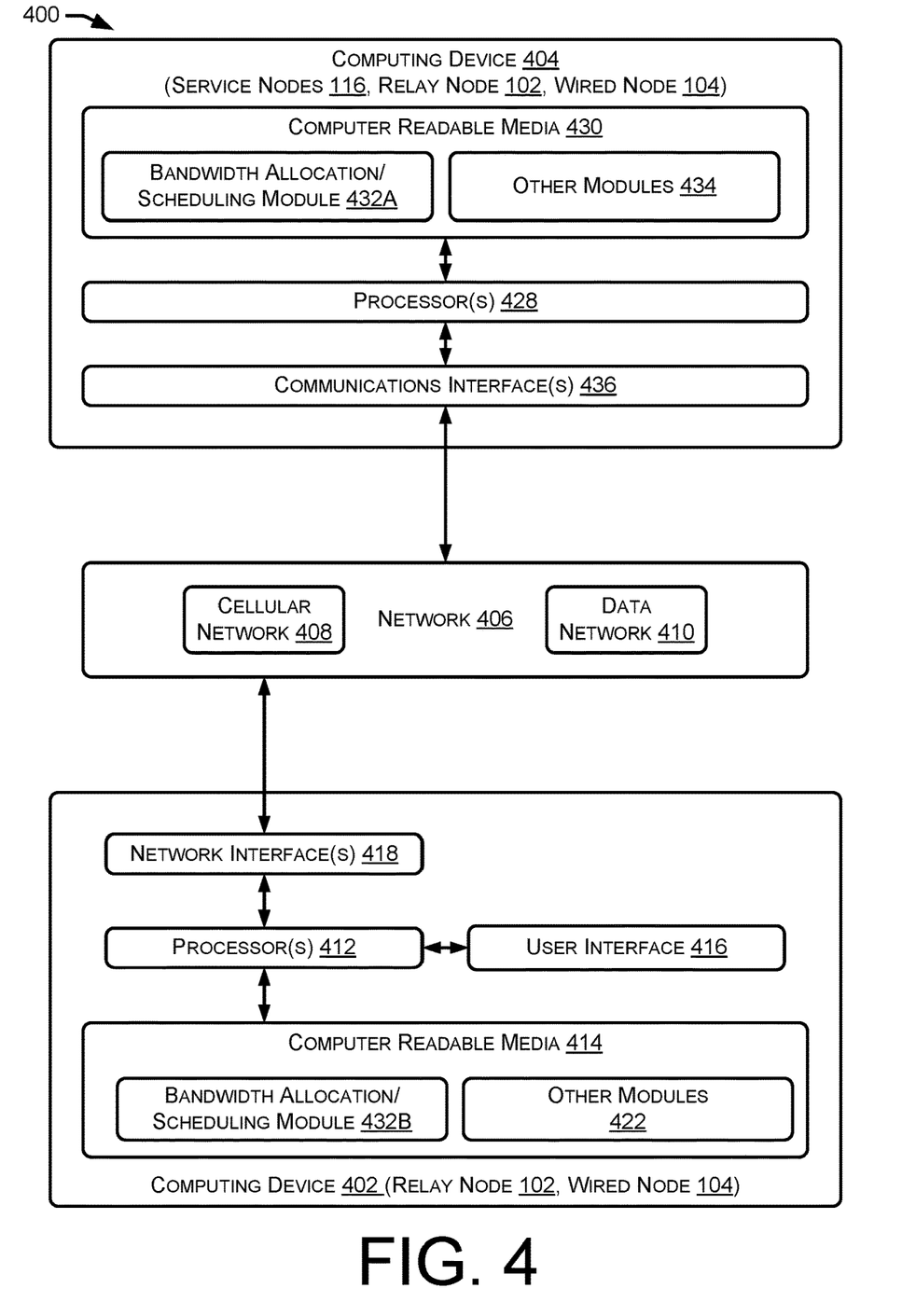
FIG. 4 is a block diagram illustrating a system that includes a bandwidth allocation/scheduling component for providing wireless backhaul in a cellular network.

FIG. 4 is a block diagram illustrating a system 400 that includes an allocation and bandwidth allocation/scheduling module 432 for identifying relay nodes 102 and allocating/scheduling bandwidth for wireless access links 124 and wireless backhaul links 126 in a cellular network according to some examples. The system 400 includes a computing device 402, which can represent relay nodes 102, and/or wired nodes 104, of FIG. 1, FIG. 2, FIG. 3 coupled to computing device 404, via a network 206. The computing device 404 can represent one or more of the service nodes 106, a relay node 102 and/or a wired node 104. The network 406 can represent, e.g., networks 122, 120 or 112.

The network 406 can include one or more core network(s) 120 connected to nodes 102, 104 via one or more access network(s), such as access network 122. Example access networks include 5G NR, LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 408 can provide wide-area wireless coverage using a technology such as GSM, Code Division Multiple Access (CDMA), UMTS, LTE, 5G NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology.

The data network 410 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the computing device 404 includes or is communicatively connected with an IWF or other device bridging networks, e.g., 5G, LTE, 3G, and POTS networks. In some examples, the computing device 404 can bridge SS7 traffic from the PSTN into the network 406, e.g., permitting PSTN customers to place calls to cellular customers and vice versa.

In some examples, the cellular network 408 and the data network 410 can carry voice or data. For example, the data network 410 can carry voice traffic using VoIP or other technologies as well as data traffic, or the cellular network 408 can carry data packets using HSPA, LTE, 5G NR, or other technologies as well as voice traffic. Some cellular networks 408 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 406 using circuit-switching (CS) transports or mixed VoLTE/3G transports, or on computing device 402 including OEM handsets and non-OEM handsets.

The computing device 402 can include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 414, such as memory (e.g., random access memory (RAM), solid state drives (SSDs), or the like), disk drives (e.g., platter-based hard drives), another type of computer-readable media, or any combination thereof. The CRM or other memory of computing device 402 can hold a datastore, e.g., an SQL or NoSQL database, a graph database, a BLOB, or another collection of data. The computing device 402 can further include a user interface (UI) 416, e.g., including an electronic display device, a speaker, a vibration unit, a touchscreen, or other devices for presenting information to a user and receiving commands from a user. The computing device 402 can further include one or more network interface(s) 4218 configured to selectively communicate (wired or wirelessly) via the network 406, e.g., via an access network 122 or 408, 410.

The CRM 414 can be used to store data and to store instructions that are executable by the processors 412 to perform various functions as described herein. The CRM 414 can store various types of instructions and data, such as an operating system, device drivers, etc. The processor-executable instructions can be executed by the processors 412 to perform the various functions described herein.

The CRM 414 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer readable instructions, data structures, program components, or other data.

The CRM 414 can include processor-executable instructions of a bandwidth allocation/scheduling module 432B. The bandwidth allocation/scheduling module 432B, can be configured to perform functionality relating to providing wireless backhaul in a cellular network, such as a 5G network. The CRM 414 can also store other modules 422 configured to perform other functionality.

The computing device 404 can include one or more processors 428 and one or more CRM 430. The CRM 430 can be used to store processor-executable instructions of a bandwidth allocation/scheduling module 432A, as well as one or more other components 434. In some configurations, the computing device 404 can be configured as a service node 106, some other service node, and the like. The processor-executable instructions can be executed by the one or more processors 428 to perform various functions described herein, e.g., with reference to FIGS. 1-4.

In some examples, computing device 404 can communicate with (e.g., is communicatively connectable with) computing device 402 or other devices via one or more communications interface(s) 436, e.g., network transceivers for wired or wireless networks, or memory interfaces. Example communications interface(s) 436 can include ETHERNET or FIBRE CHANNEL transceivers, WIFI radios, or DDR memory-bus controllers (e.g., for DMA transfers to a network card installed in a physical server 204).

In some examples, processor 412 and, if required, CRM 414, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 428 and, if required, CRM 430.

Figure 5:
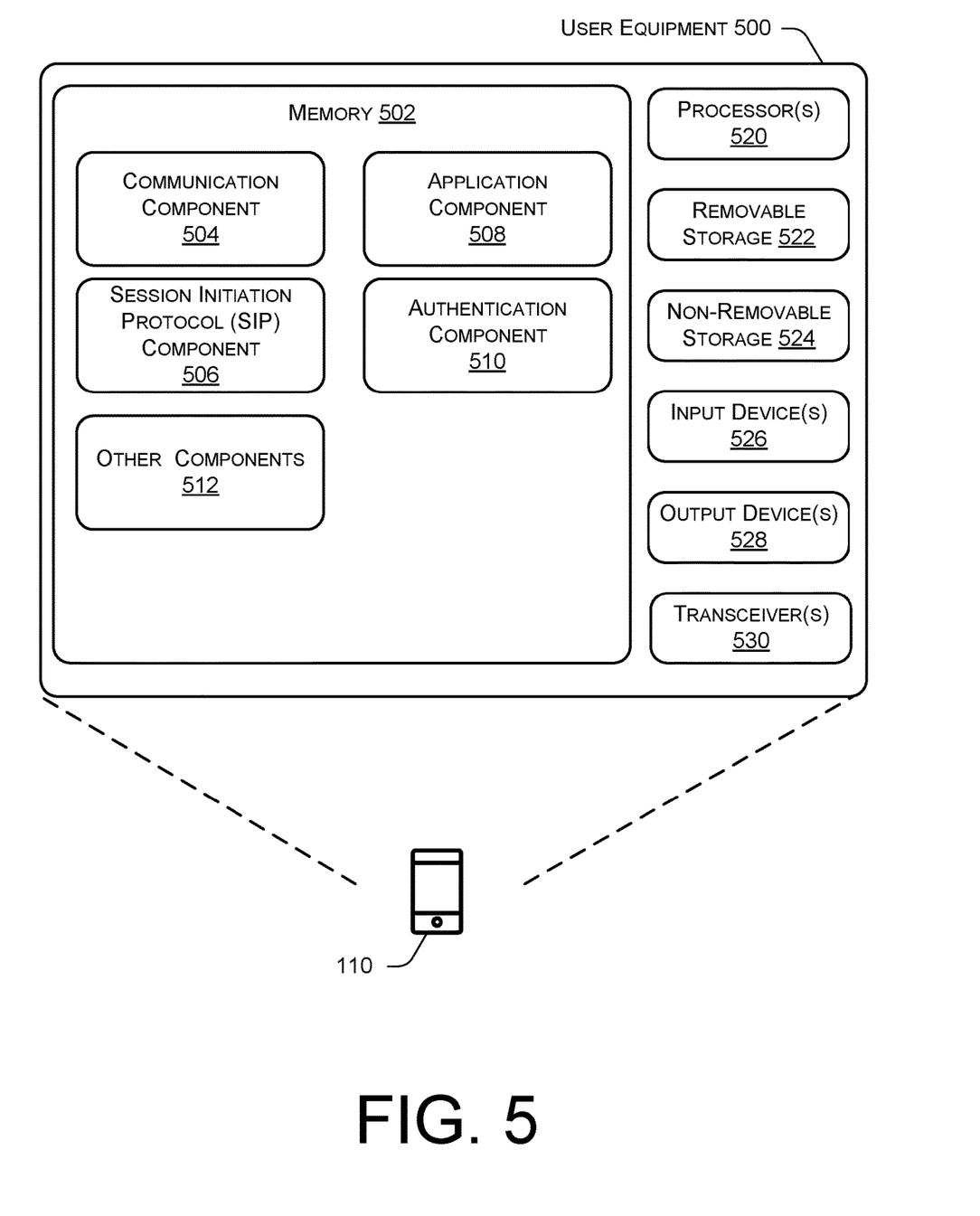
FIG. 5 is a block diagram illustrating an example user device configured to connect to a relay node that provides wireless backhaul in a cellular network.

FIG. 5 illustrates an example user equipment (UE) 500 configured to connect to a relay node that provides wireless backhaul in a cellular network. In some embodiments, the UE 500 can correspond to the UE 110 of FIG. 1. It is to be understood in the context of this disclosure that the UE 500 can be implemented as a single device or as a plurality of devices with components and data distributed among them.

As illustrated, the UE 500 comprises a memory 502 storing the communication component 504, a session initiation protocol (SIP) component 506, an application component 508, an authentication component 510, and other components 512. Also, the UE 500 includes processor(s) 520, a removable storage 522 and non-removable storage 524, input device(s) 526, output device(s) 528, and transceiver(s) 530.

In various embodiments, the memory 502 is volatile (such as RAM), nonvolatile (such as ROM, flash memory, etc.) or some combination of the two. The communication component 504, the SIP component 506, the application component 508, the authentication component 510, and the other components 512 stored in the memory 502 can comprise methods, threads, processes, applications, or any other sort of executable instructions. The communication component 504, the SIP component 506, the application component 508, the authentication component 510, and the other components 512 can also include files and databases.

The communication component 504 may include functionality to send and receive communication (e.g., a voice call, an SMS, or an MMS) and/or perform other operations. In some examples, the communication component 504 may perform a number of functions, such as interfacing with the transceiver(s) 530, preparing the user equipment 500 to receive or handover a call, tuning the transceiver(s) 530, receiving and processing an invitation message such as a SIP Message received via the transceiver(s) 530, transmitting other messages via the transceiver(s) 530, detecting a failure condition, and the like.

The SIP component 506 may be an application that enables calls to be served via Voice over Internet Protocol (VoIP) using Session Initiation Protocol (SIP) signaling. The SIP component 506 may determine a current location of the user equipment 500 using a Global Positioning System (GPS).

The application component 508 may display various information associated with a communication session. The application component 508 may provide a portal for the user to sign up for services with a service provider. In various examples, the application component 508 may provide an interface for the user(s) to register new user accounts and download one or more applications associated with the service provider, such as the authentication component 510. The application component 508 may communicate with servers of the service provider for the user equipment(s) 110 through the communication component 504 to receive or update user settings.

The authentication component 510 may perform various types of authentication. The authentication component 510 may interact with the database(s) to store, retrieve, and update the database(s) containing user subscription information, including items such as user identification and addressing (e.g., the IMSI (International Mobile Subscriber Identity) and MSISDN (Mobile Subscriber ISDN Number)), user profile information (e.g., subscription data). The authentication component 310 may also be configured to perform other operations.

The authentication component 510 may authenticate the UE 500 to send and receive communication using a user account. The other components 512 may perform other operations. In some embodiments, the processor(s) 520 is a central processing unit (CPU), a graphics processing unit (GPU), or both CPU and GPU, or other processing unit or component known in the art.

The UE 500 also includes additional data storage devices (removable and/or non-removable) such as, for example, magnetic disks, optical disks, or tape. Such additional storage is illustrated in FIG. 5 by removable storage 522 and non-removable storage 524. Tangible computer-readable media can include volatile and nonvolatile, removable and non-removable media implemented in any method or technology for storage of information, such as computer readable instructions, data structures, program modules, or other data. The memory 502, the removable storage 522 and the non-removable storage 524 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the UE 300. Any such tangible computer-readable media can be part of the UE 300.

The UE 500 can include input device(s) 526, such as a keypad, a cursor control, a touch-sensitive display, etc. Also, the UE 500 can include output device(s) 528, such as a display, speakers, etc. These devices are well known in the art and need not be discussed at length here.

As illustrated in FIG. 5, the UE 500 can include one or more wired or wireless transceiver(s) 530. In some wireless embodiments, to increase throughput, the transceiver(s) 530 can utilize multiple-input/multiple-output (MIMO) technology. The transceiver(s) 530 can be any sort of wireless transceivers capable of engaging in wireless, radio frequency (RF) communication, as discussed herein. The transceiver(s) 530 can also include other wireless modems, such as a modem for engaging in Wi-Fi, WiMAX, Bluetooth, infrared communication, or the like.

Figure 6:
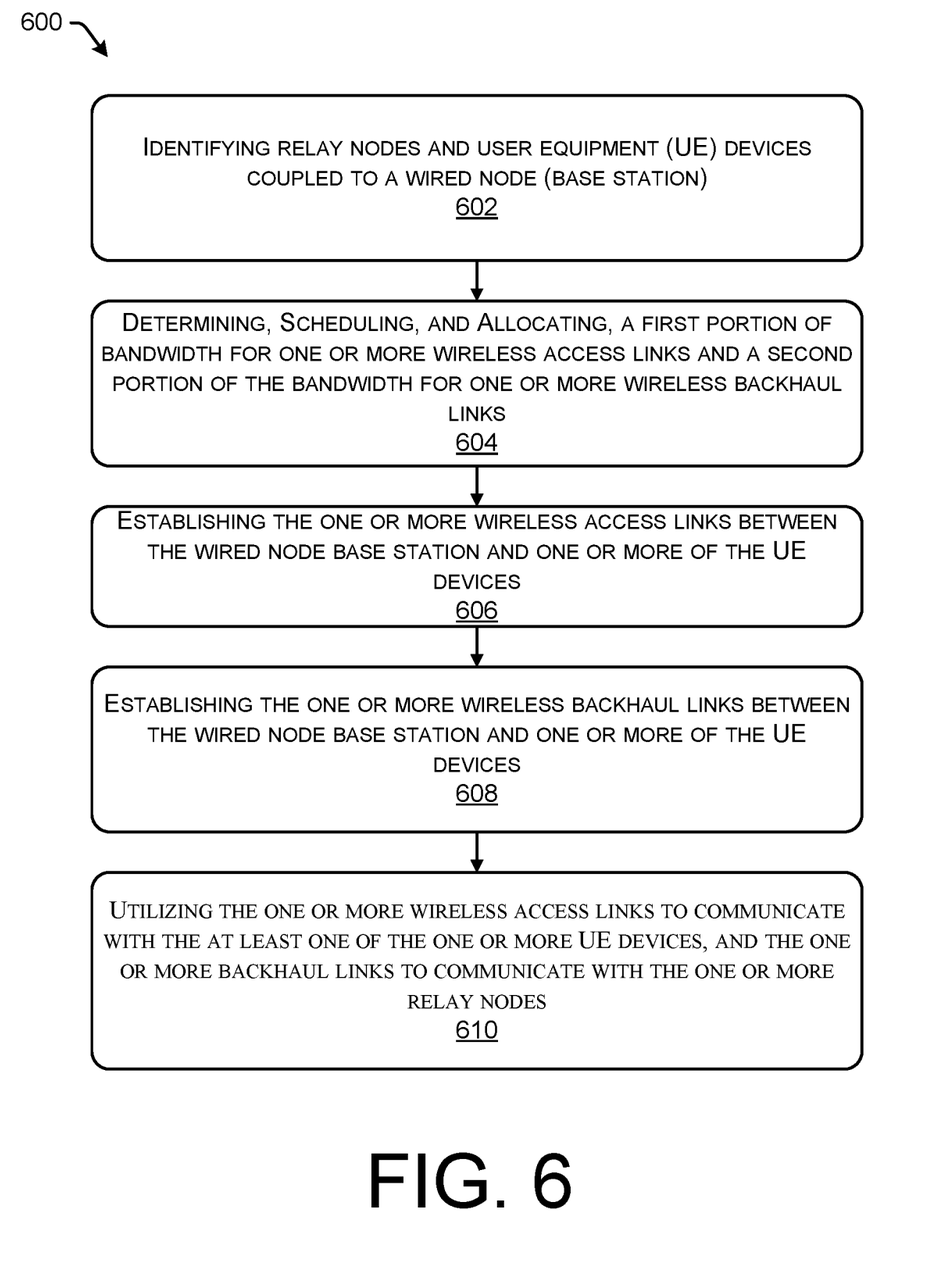
FIG. 6 illustrates an example process for using relay nodes to provide wireless backhaul in a cellular network.

FIG. 6 illustrates an example process 600 in accordance with embodiments of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process for using relay nodes to provide wireless backhaul in a cellular network. The example process 600 can be performed by one or more of the relay nodes 102, the wired nodes 104, the computing device 402, computing device 404, the service nodes 106, or one or more other components, in connection with other components discussed herein. Some or all of the process 600 can be performed by one or more devices, equipment, or components illustrated in FIGS. 1-5, for example.

At 602, relay nodes 102 and user equipment (UE) devices 110 coupled to the wired node 104 are determined. As discussed above, the relay nodes 102 may be IAB nodes and the wired nodes may be gNodeB nodes. In some examples, the nodes 102, 104 operate in a 5G network that utilize one or more of a centimeter wave band or a millimeter wave bands. In some examples, the processors of the wired node 104 are configured to determine the coupled relay nodes and UE 110. In other examples, processors of one or more of the relay nodes 102 can be utilized.

At 604, after identifying the coupled relay nodes 102 and the UE devices 110, the allocation of bandwidth between access links 124 and backhaul links 126 is determined. As discussed above, different techniques can be utilized to determine the allocation and scheduling. For examples, a MST can be utilized to determine a path using the available relay nodes 102. Generally, the techniques are utilized to select the relay nodes 102 to couple a UE 110 to a wired node 104.

At 606, the one or more wireless access links between the wired node and one or more of the UE devices are established. As discussed above, different relay nodes 102 can be utilized to provide the wireless access links 124 between the UE 110 and a wired node 104.

At 608, the one or more wireless backhaul links between the wired node base station and one or more of the relay nodes is established. As discussed above, different relay nodes 102 can be utilized to provide the wireless backhaul links 126 between the UE 110 and a wired node 104.

At 610, the one or more wireless access links 124 and the one or more backhaul links 126 are utilized to communicate with a UE device 110. As discussed above, the links may change over time depending on various network conditions and/or other criteria.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors of a fifth generation (5G) base station that uses one or more of a centimeter wave band or a millimeter wave band for communication; and
programming instructions configured to be executed by the one or more processors to perform operations comprising:
identifying relay nodes and user equipment (UE) devices wirelessly coupled to the 5G base station, wherein a first relay node of the relay nodes is connected to the 5G base station and a second relay node of the relay nodes is connected to the first relay node;
allocating, based at least in part on the identifying the relay nodes and the UE devices, a first portion of bandwidth for one or more wireless access links and a second portion of the bandwidth for one or more wireless backhaul links;
establishing the one or more wireless access links between the 5G base station and one or more of the UE devices;
establishing the one or more wireless backhaul links between the 5G base station and one or more of the relay nodes; and
utilizing the one or more wireless access links to communicate with the at least one of the one or more UE devices, and the one or more backhaul links to communicate with the one or more relay nodes,
wherein the first portion of the bandwidth is different from the second portion of the bandwidth.

2. The system of claim 1, wherein the 5G base station is a next generation NodeB (gNodeB) that includes a wired backhaul to a core network, and the relay nodes are Integrated Access Backhaul (IAB) nodes.

3. The system of claim 1, wherein allocating the first portion of the bandwidth for the one or more wireless access links and the second portion of the bandwidth for the one or more wireless backhaul links is based at least in part on a number of the UE devices.

4. The system of claim 1, wherein establishing the one or more wireless backhaul links between the 5G base station and one or more of the relay nodes comprises determining one or more routes for the one or more wireless backhaul links.

5. The system of claim 1, wherein at least one of the one or more wireless access links and at least one of the one or more wireless backhaul links utilize a same frequency.

6. The system of claim 1, wherein at least a portion of the relay nodes form a mesh network.

7. A computer-implemented method performed by one or more processors configured with specific instructions, the computer-implemented method comprising:
identifying relay nodes that use one or more of a centimeter wave band or a millimeter wave band, and user equipment (UE) devices coupled to a wired node, wherein a first relay node of the relay nodes is connected to the wired node and a second relay node of the relay nodes is connected to the first relay node;
allocating based at least in part on the identifying the relay nodes and the UE devices, a first portion of bandwidth for one or more wireless access links and a second portion of the bandwidth for one or more wireless backhaul links;
establishing the one or more wireless access links between the wired node and one or more of the UE devices;
establishing the one or more wireless backhaul links between the wired node and one or more of the relay nodes; and
utilizing the one or more wireless access links to communicate with the at least one of the one or more UE devices, and the one or more backhaul links to communicate with the one or more relay nodes,
wherein the first portion of the bandwidth is different from the second portion of the bandwidth.

8. The computer-implemented method of claim 7, wherein the wired node is a next generation NodeB (gNodeB) that includes a wired backhaul to a core network, and the relay nodes are Integrated Access Backhaul (IAB) nodes.

9. The computer-implemented method of claim 8, wherein the allocating is performed by one or more of the gNodeB or one or more of the IABs.

10. The computer-implemented method of claim 7, wherein allocating the first portion of the bandwidth for the one or more wireless access links and the second portion of the bandwidth for the one or more wireless backhaul links is based at least in part on a number of the UE devices.

11. The computer-implemented method of claim 7, wherein establishing the one or more wireless backhaul links between the wired node and one or more of the relay nodes comprises determining one or more routes for the one or more wireless backhaul links.

12. The computer-implemented method of claim 7, wherein at least one of the one or more wireless access links and at least one of the one or more wireless backhaul links utilize a same frequency.

13. The computer-implemented method of claim 7, wherein at least a portion of the relay nodes form a mesh network.

14. A non-transitory computer-readable media storing computer-executable instructions that, when executed, cause one or more processors of a computing device to perform acts comprising:
identifying relay nodes that use one or more of a centimeter wave band or a millimeter wave band, and user equipment (UE) devices coupled to a wired node, wherein a first relay node of the relay nodes is connected to the wired node and a second relay node of the relay nodes is connected to the first relay node;
determining, based at least in part on the identifying the relay nodes and the UE devices, a first portion of bandwidth to allocate for one or more wireless access links and a second portion of the bandwidth to allocate for one or more wireless backhaul links;
causing the one or more wireless access links between the wired node and one or more of the UE devices to be established;
causing the one or more wireless backhaul links between the wired node and one or more of the relay nodes to be established; and
causing the one or more wireless access links to be used to communicate with the at least one of the one or more UE devices, and the one or more backhaul links to be used communicate with the one or more relay nodes,
wherein the first portion of the bandwidth is different from the second portion of the bandwidth.

15. The non-transitory computer-readable media of claim 14, wherein the wired node is a next generation NodeB (gNodeB) that includes a wired backhaul to a core network, and the relay nodes are Integrated Access Backhaul (IAB) nodes.

16. The non-transitory computer-readable media of claim 15, wherein determining the first portion of bandwidth to allocate for one or more wireless access links and the second portion of the bandwidth to allocate is performed by one or more of the gNodeB or one or more of the IABs.

17. The non-transitory computer-readable media of claim 14, wherein determining the first portion of bandwidth to allocate for one or more wireless access links and the second portion of the bandwidth to allocate is based at least in part on a number of the UE devices.

18. The non-transitory computer-readable media of claim 14, wherein causing the one or more wireless backhaul links to be established between the wired node and one or more of the relay nodes comprises determining one or more routes for the one or more wireless backhaul links.

19. The non-transitory computer-readable media of claim 14, wherein at least one of the one or more wireless access links and at least one of the one or more wireless backhaul links utilize a same frequency.

20. The non-transitory computer-readable media of claim 14, wherein at least a portion of the relay nodes form a mesh network.

* * * * *